United States Patent
Pereira et al.

(10) Patent No.: US 7,303,799 B2
(45) Date of Patent: *Dec. 4, 2007

(54) FRANGIBLE FIBERGLASS INSULATION BATTS

(75) Inventors: Jon Pereira, Shelbyville, IN (US); Ronald A. Houpt, Shelbyville, IN (US)

(73) Assignee: Knauf Insulation GmbH, Shelbyville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/319,037

(22) Filed: Dec. 27, 2005

(65) Prior Publication Data

US 2006/0188682 A1    Aug. 24, 2006

Related U.S. Application Data

(62) Division of application No. 10/407,397, filed on Apr. 4, 2003, now Pat. No. 6,979,381.

(60) Provisional application No. 60/372,121, filed on Apr. 12, 2002.

(51) Int. Cl.
  *B32B 7/06* (2006.01)
  *B32B 7/12* (2006.01)

(52) U.S. Cl. ........................................ 428/43

(58) Field of Classification Search .................. 428/43; 52/404.1, 98
  See application file for complete search history.

(56) References Cited

U.S. PATENT DOCUMENTS

| | | | |
|---|---|---|---|
| 1,238,356 A | 8/1917 | Stokes | |
| 2,694,660 A * | 11/1954 | Schwartz | 428/332 |
| 3,493,452 A | 2/1970 | Cole | |
| 3,546,846 A | 12/1970 | Sens | |
| 3,736,215 A | 5/1973 | Felder, Jr. et al. | |
| 3,955,031 A | 5/1976 | Jones et al. | |
| 4,342,610 A | 8/1982 | Ray, Jr. | |
| 4,362,585 A | 12/1982 | de Antonis et al. | |
| 4,552,793 A | 11/1985 | Cameron et al. | |
| 4,700,521 A | 10/1987 | Cover | |
| 4,772,499 A | 9/1988 | Greenway | |
| 4,866,905 A * | 9/1989 | Bihy et al. | 52/742.12 |
| 5,240,527 A | 8/1993 | Lostak et al. | |
| 5,350,663 A | 9/1994 | Blum et al. | |
| 5,765,318 A | 6/1998 | Michelsen | |
| 5,981,037 A | 11/1999 | Patel et al. | |
| 6,083,594 A | 7/2000 | Weinstein et al. | |
| 6,165,305 A | 12/2000 | Weinstein et al. | |
| 6,191,057 B1 | 2/2001 | Patel et al. | |
| 6,357,504 B1 | 3/2002 | Patel et al. | |
| 6,383,594 B2 | 5/2002 | Weinstein et al. | |
| 6,399,694 B1 | 6/2002 | McGrath et al. | |
| 6,484,463 B1 | 11/2002 | Fay | |
| 6,935,080 B2 * | 8/2005 | Allwein et al. | 52/404.1 |

* cited by examiner

Primary Examiner—Alexander S. Thomas
(74) Attorney, Agent, or Firm—Barnes & Thornburg LLP

(57) ABSTRACT

A frangible fiberglass insulation batt includes a pair of fiberglass strips arranged to lie in side-by-side relation to one another and a frangible polymerized binder bridge spanning a gap between the fiberglass strips and retaining the fiberglass strips in side-by-side relation. To produce such a batt, a stream of uncured fiberglass insulation is cut along its length to form two side-by-side fiberglass strips and then passed through a curing oven to cause heat generated in the oven to polymerize (cure) binder associated with the strips in the gap to form the frangible polymerized binder bridge.

7 Claims, 3 Drawing Sheets

US 7,303,799 B2

FRANGIBLE FIBERGLASS INSULATION BATTS

This application is a divisional of U.S. patent application Ser. No. 10/407,397, which was filed Apr. 4, 2003, which issued as U.S. Pat. No. 6,979,381 on Dec. 27, 2005, and which claimed priority under 35 U.S.C. §119(e) to U.S. Provisional Application Ser. No. 60/372,121, filed Apr. 12, 2002, the disclosures of which are hereby expressly incorporated by reference herein.

BACKGROUND

The present disclosure relates to apparatus and methods for producing fiberglass insulation batts, and in particular, batts of fiberglass insulation suitable for use in building construction. More particularly, the present disclosure relates to fiberglass insulation batts that are configured to be converted into separate fiberglass insulation strips of various predetermined widths in the field without the use of cutting tools.

Fiberglass insulation is made of glass fibers held together by a binder. Glass fibers are produced by melting sand or recycled glass products and spinning those materials to produce tiny strands of fiberglass. Glass fibers will not stick together unless they are glued or bound together. A binder is an adhesive material that holds fibers together, allowing them to keep their shape or overall form. Fiberglass insulation is made, for example, by spraying a binder on the glass fibers. After being cured in an oven, the binder holds the fibers together.

A batt is a blanket of fiberglass insulation used to insulate residential and commercial buildings. Some batts include a paper or foil facing material affixed to the fiberglass insulation, and other batts do not include any facing material.

According to the present disclosure, a frangible fiberglass insulation batt includes a pair of fiberglass strips arranged to lie in side-by-side relation to one another and a frangible polymerized binder bridge spanning a gap between the fiberglass strips and retaining the fiberglass strips in side-by-side relation. Although glass fibers and binder are present in normal amounts in the fiberglass strips, an insubstantial amount of glass fibers is present in the binder bridge. Thus, internal bonds of the binder bridge are relatively weak in comparison to internal bonds of the fiberglass strips.

In the field at a construction site, a worker can separate one of the fiberglass strips (included in the frangible fiberglass insulation batt according to the present disclosure) from the other of the strips by pulling one strip laterally away from the other strip using a "peeling away" action owing to relatively weak internal bonds in the frangible polymerized binder bridge. No tools are needed to accomplish such separation of the two fiberglass strips.

A method of producing such a frangible fiberglass insulation batt comprises the steps of passing a stream of uncured fiberglass insulation through a cutter to form two side-by-side fiberglass strips and then passing the two side-by-side strips through a curing oven. In the curing oven, heat generated in the oven causes binder associated with opposing longitudinally extending side walls of the strips to polymerize in a gap between the two side-by-side strips to establish the frangible polymerized binder bridge. This binder bridge spans the gap and retains the two fiberglass strips in fixed relation to one another until the frangible polymerized binder bridge is torn along its length by a construction worker in the field.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION

Apparatus and methods are disclosed herein for producing a fiberglass insulation batt that is not slitted when it is delivered to a construction site yet is formed to include longitudinally extending frangible planes therein to enable construction workers to convert the unslitted fiberglass insulation batt into separate fiberglass insulation strips of various predetermined widths in the field without the use of cutting tools. A "batt" is a blanket of thermal insulation usually comprising glass fibers.

Relatively weak internal bonds are established during manufacture of the fiberglass insulation batt to define the longitudinally extending frangible planes using apparatus and methods described herein. These internal bonds are strong enough to hold the fiberglass insulation batt "together in one piece" during transport from inventory to a construction site and yet are weak enough to allow a construction worker to separate one longitudinally extending strip in the batt from an adjacent longitudinally extending strip in the batt manually and without the use of cutting tools.

Figure 1:
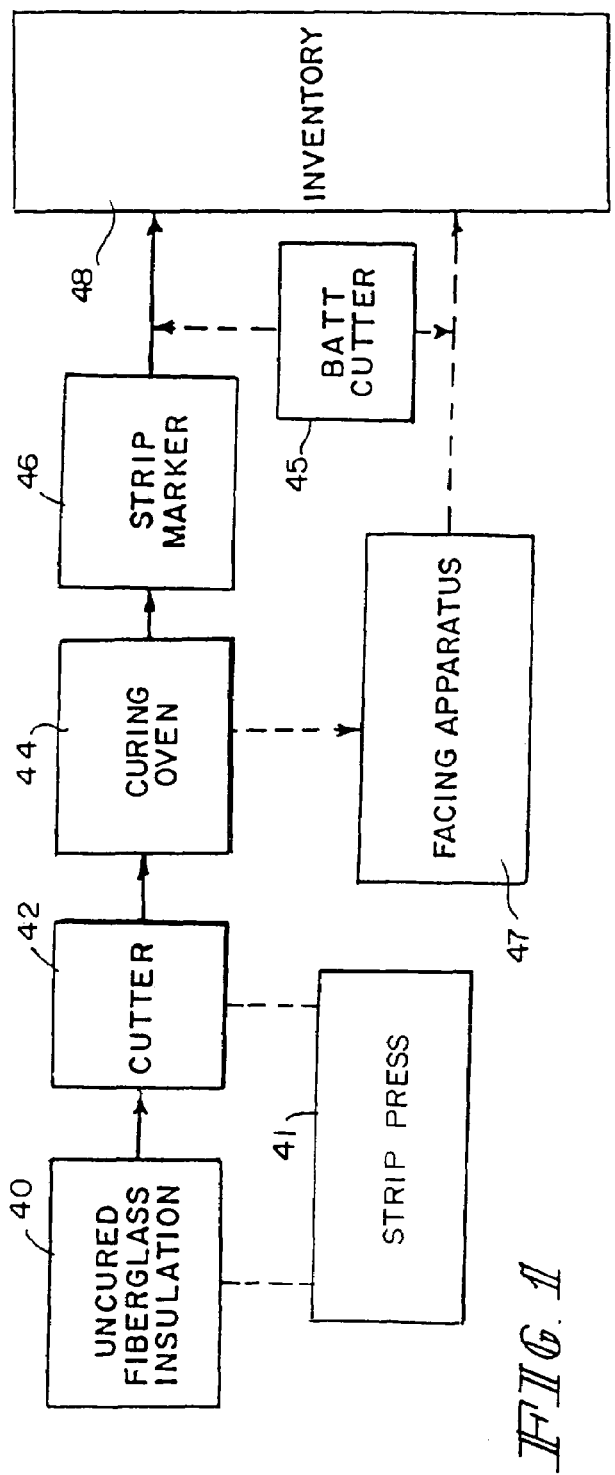
FIG. 1 is a diagrammatic view of methods in accordance with the present disclosure for producing a frangible fiberglass insulation batt (that can be separated by hand into strips having predetermined widths) by cutting an uncured fiberglass batt in a "cutter", then curing that fiberglass batt in a "curing oven" to cause adjacent insulation strips produced by the cutter to bond together to establish a frangible plane therebetween, and then using either a "strip marker" or "facing apparatus" to indicate the location of the frangible planes in the cured fiberglass batt.
Figure 2:
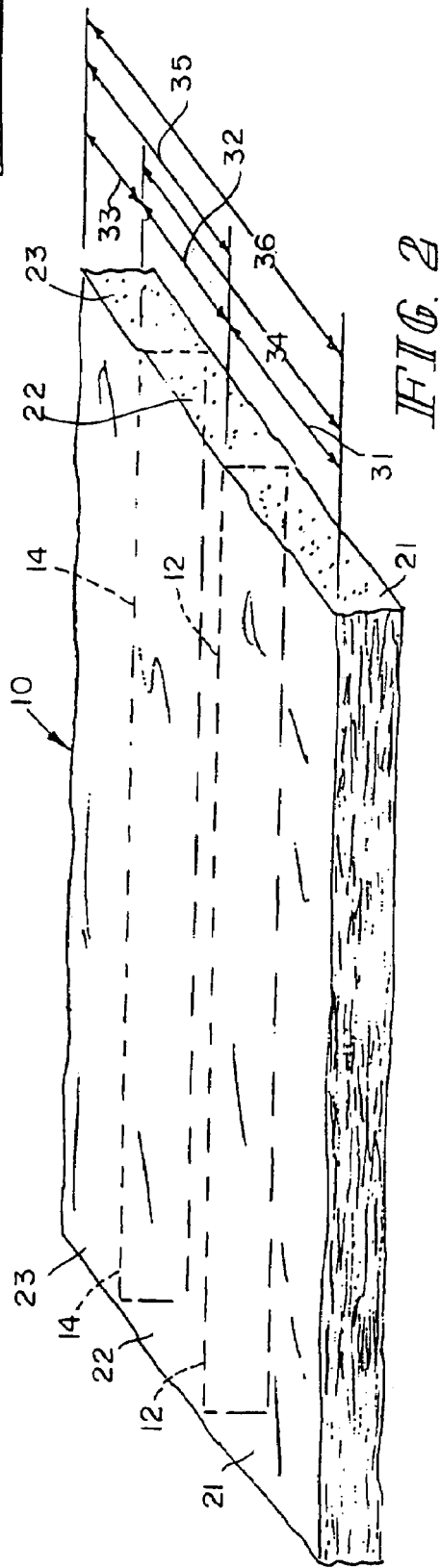
FIG. 2 is a perspective view of a frangible fiberglass insulation batt formed to include two frangible planes extending along the length of the batt so that the batt can be "broken" manually along the two frangible planes to produce three separate insulation strips without the use of cutting tools.

Various methods are suggested diagrammatically in FIG. 1 for producing a frangible fiberglass insulation batt 10 shown, for example, in FIG. 2. Batt 10 is formed using apparatus and methods disclosed herein to include two longitudinally extending frangible planes 12, 14 which are arranged to lie in spaced-apart parallel relation to one another to "partition" batt 10 into three formative longitudinally extending strips 21, 22, and 23.

In the field at a construction site, a worker can separate first strip 21 from second strip 22 along first frangible plane 14 by pulling one strip laterally away from the other strip using a "peeling-away" action owing to relatively weak internal bonds established along first frangible plane 12 between fiberglass material comprising first and second strips 21, 22. Likewise, a worker can separate third strip 23 from second strip 22 along second frangible plane 12 by pulling one of those strips away from the other of those strips in a similar manner owing to relatively weak internal bonds established along second frangible plane 14 between fiberglass material comprising second and third strips 22, 23.

During building construction activities, workers often need to create insulation strips of non-conventional width and the ability to create a variety of strip widths without using cutting tools by use of frangible fiberglass insulation batt 10 would be welcomed by many workers in the construction trade. As suggested in FIG. 2, first strip 21 has a width 31, second strip 22 has a width 32, and third strip 23 has a width 33. When bonded together during manufacture, first and second strips 21, 22 have a combined width 34, second and third strips 22, 23 have a combined width 35, and first, second, and third strips 21, 22, and 23 have a combined width 36. By selecting the location of frangible planes 12, 14 carefully during manufacture, it is possible to create a unified but frangible fiberglass insulation batt that can be separated in the field to produce a wide variety of insulation strip widths without using cutting tools. Because batt 10 is unslitted when delivered to a construction site, batt 10 will function to provide maximum insulation coverage for the full surface area of batt 10. There are no slits in batt 10 which could provide internal channels for conducting cold air along a path partly through the thickness of the insulation batt.

Uncured fiberglass insulation comprises glass fibers coated with a binder. The binder "sets" when exposed to high temperature in a curing oven to bind the glass fibers together. Using the apparatus and method of the present disclosure, separated side-by-side strips of uncured fiberglass insulation are passed through a curing oven to cause the binder to polymerize across a small gap between the side-by-side strips to establish a "bridge" of polymerized binder (containing only an insubstantial amount of glass fibers) spanning that small gap and coupling the side-by-side strips together. Because the polymerized binder bridge contains only an insubstantial amount of glass fibers, it is readily or easily broken (i.e., frangible) in response to manual "tearing" or "peeling" forces applied by a construction worker in the field so that the worker can separate one strip from its side-by-side companion strip manually without the use of cutting tools.

Using a first method illustrated diagrammatically in FIG. 1, a stream of uncured fiberglass insulation 40 is passed through a cutter 42 to cut the uncured fiberglass insulation 40 into two or more separate strips. These strips are then passed through a curing oven 44 to cause the binder associated with longitudinally extending side walls of adjacent strips to polymerize to establish a frangible bridge spanning the gap between the opposing side walls of the adjacent strips during exposure to fiberglass curing heat (at a temperature of about 350° F. to 600° F.) to produce a batt 10 that appears to be monolithic and yet comprises at least one pair of adjacent insulation strips bonded to one another by relatively weak internal bonds along a frangible plane located therebetween. Before batt 10 is delivered to inventory 48, it is passed through a strip marker 46 that operates to apply one or more "indicator lines" to an exterior surface of batt 10 to mark the location of each longitudinally extending frangible plane in the batt 10.

Using a second method illustrated diagrammatically in FIG. 1, uncured fiberglass insulation 40 is passed through a strip press 41 to compress uncured fiberglass insulation 40 to a compacted thickness before such uncured fiberglass insulation 40 is passed through cutter 42. Using another method illustrated diagrammatically in FIG. 1, a facing apparatus 47 is used to apply a facing material (pre-marked with indicator lines) to one surface of the now-cured fiberglass insulation to align the indicator lines with the frangible planes formed in the cured fiberglass insulation.

As suggested in FIG. 1, a batt cutter 45 is provided downstream of strip marker 46 or facing apparatus 47. Batt cutter 45 is configured to periodically cut the strips 21, 22, 23 and frangible "bridges" 12, 14 laterally to provide a series of separate elongated frangible fiberglass insulation batts (not shown) for delivery to inventory 48.

Figure 3:
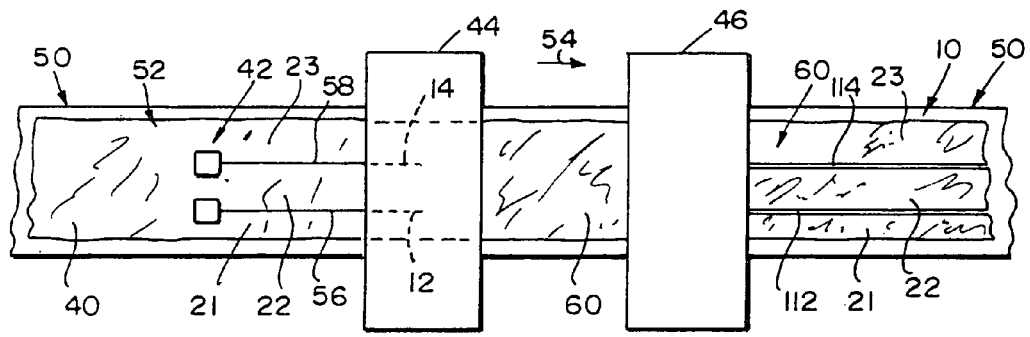
FIG. 3 is a top plan view of a first system for producing a frangible fiberglass insulation batt, which system uses a conveyor to move fiberglass insulation (in a direction from left to right) along a path so that the fiberglass insulation is intercepted by, in sequence, a pair of cutters for cutting the insulation to form three separate insulation strips, a curing oven for polymerizing a binder coating glass fibers included in the insulation strips to form a frangible bridge substantially made of polymerized binder and spanning the gap between each pair of side-by-side insulation strips, and a strip marker for applying indicator lines to the fiberglass insulation to indicate the location of the frangible planes formed in the fiberglass insulation batt and established by the polymerized binder bridges.

In the embodiment illustrated in FIG. 3, cutter 42, curing oven 44, and strip marker 46 are arranged along a conveyor 50 to intercept a stream of fiberglass insulation 52 moved by conveyor 50 in direction 54. Cutter 42 cuts all the way through uncured fiberglass insulation 40 as the insulation 40 passes through cutter 42 to provide first, second, and third strips 21, 22, and 23 separated by longitudinally extending gaps 56 and 58.

These strips 21, 22, and 23 are then passed through curing oven 44 and heat generated in oven 44 polymerizes binder coating glass fibers in strips 21, 22, and 23 to produce cured fiberglass insulation comprising (1) cured fiberglass strips 21, 22, and 23 separated by gaps 56, 58 and (2) a longitudinally extending frangible polymerized binder bridge spanning each of gaps 56 and 58. To the naked eye, these gaps 56, 58 seem to "disappear" owing to the development of the polymerized binder bridges in gaps 56, 58 to cause an observer to perceive that cured fiberglass insulation 60 is a monolithic material. In fact, the polymerized binder bridge in longitudinally extending gap 56 defines a first frangible plane 12 and the polymerized binder bridge in longitudinally extending gap 58 defines a second frangible plane 14.

The cured fiberglass insulation 60 is then passed through strip marker 46 wherein an indicator line 112 is applied to an exterior portion of insulation 60 to mark the location of first frangible plane 12 and an indicator line 114 is applied to the exterior portion of insulation 60 to mark the location of second frangible plane 14. Ink, tape, or any other suitable visible marking agent can be used to establish indicator lines 112, 114. Cured fiberglass insulation 60 bearing indicator lines 112, 114 is then cut laterally to certain lengths to provide a series of batts 10 for delivery to inventory 48.

Figure 4:
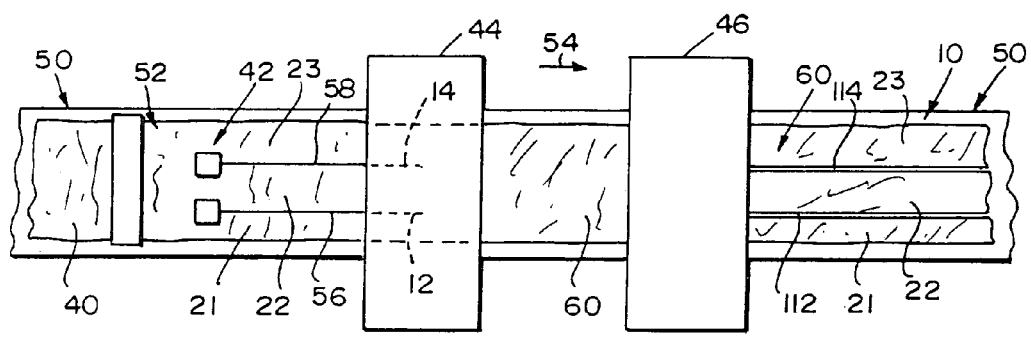
FIG. 4 is a top plan view of a second system for producing a frangible fiberglass insulation batt, which system uses a conveyor to move fiberglass insulation along a path so that the fiberglass insulation is intercepted by, in sequence, a fiberglass-compacting strip press, a pair of cutters, a curing oven, and a strip marker.
Figure 5:
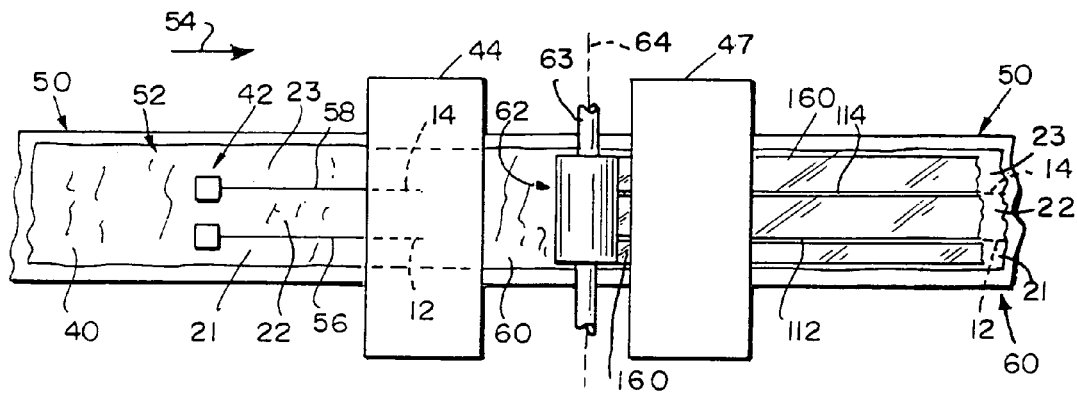
FIG. 5 is a top plan view of a third system for producing a frangible fiberglass insulation batt, which system uses a conveyor to move fiberglass insulation so that the fiberglass insulation is intercepted by, in sequence, a pair of cutters, a curing oven, and a facing apparatus for applying a facing material (pre-marked with indicator lines) drawn off a supply roll to a top surface of the now-cured fiberglass insulation batt to align the indicator lines on the facing material with the frangible planes formed in the cured fiberglass insulation batt.

In the embodiment illustrated in FIG. 4, cutter 42, curing oven 44, and strip marker 46 are arranged along conveyor 50 and used in the manner described above to produce batts 10. However, in this embodiment, a strip press 41 is arranged along conveyor 50 to lie upstream of cutter 42. Strip press 41 is configured to compress uncured fiberglass insulation 40 to a compacted thickness to facilitate cutting of insulation 40 in cutter 42.

In the embodiment illustrated in FIG. 4, cutter 42 and curing oven 44 are arranged along conveyor 50 and used in the manner described above to produce cured fiberglass insulation 60 containing longitudinally extending frangible planes 12 and 14. However in this embodiment facing apparatus 47 is used to apply a facing material 160 (pre-marked with indicator lines 112 and 114) to a top surface of cured fiberglass insulation 60 to align indicator lines 112, 114 on facing material 160 with frangible planes 12, 14 formed in cured fiberglass insulation 60. Facing material 160 is drawn off a supply roll 62 that is mounted on axle 63 for rotation about axis 64 in a location above conveyor 50. It is within the scope of this disclosure to use any suitable means to affix facing material 160 to cured fiberglass insulation 60 as insulation 60 is moved in direction 54 by conveyor 50.

Figure 6:
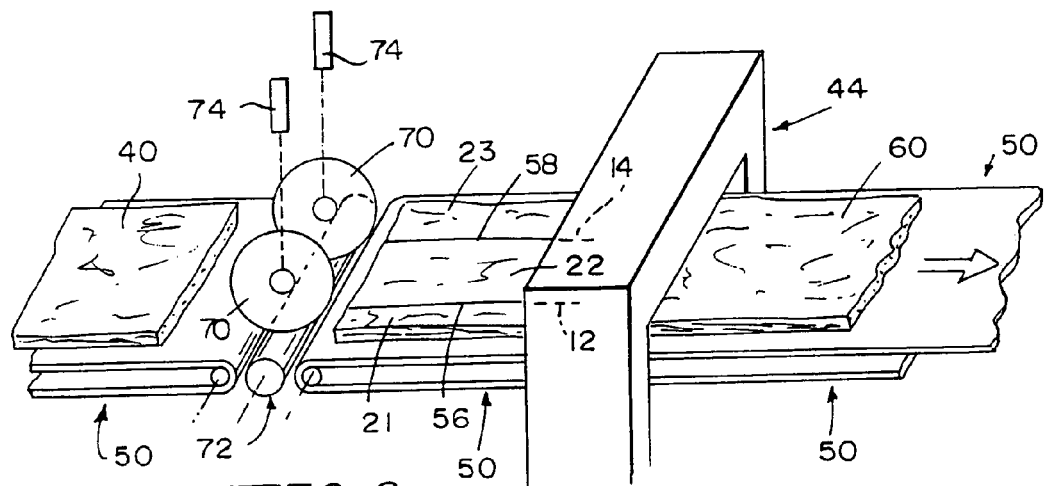
FIG. 6 is a perspective view of a system similar to the system illustrated in FIG. 3 showing a pair of cutter disks mounted to lie above a roller located between two sections of a conveyor and arranged to slice all of the way through uncured fiberglass insulation moving with the conveyor before the uncured fiberglass insulation is cured in the curing oven.
Figure 7:
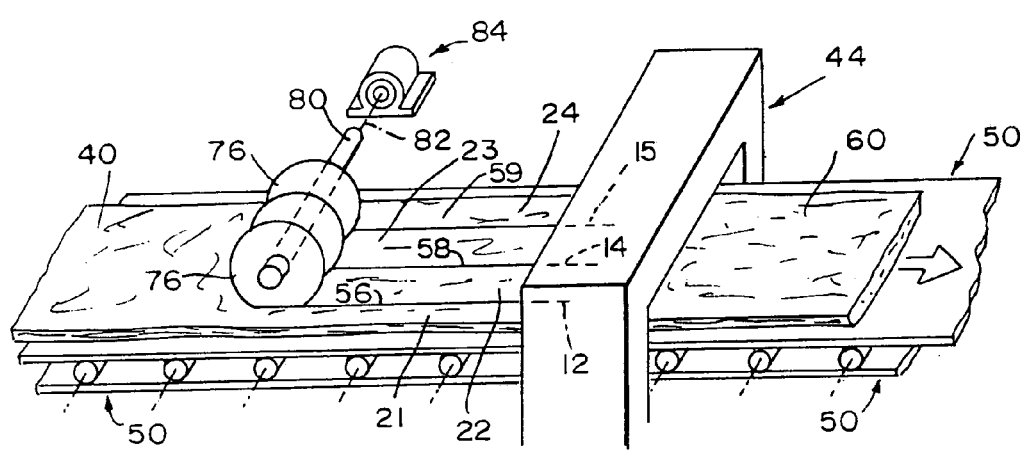
FIG. 7 is a perspective view of a system similar to the system illustrated in FIG. 6 showing use of a motorized rotary-driven power cutter to form a series of cuts extending all of the way through the fiberglass insulation to define separated side-by-side strips of fiberglass insulation "upstream" of the curing oven.
Figure 8:
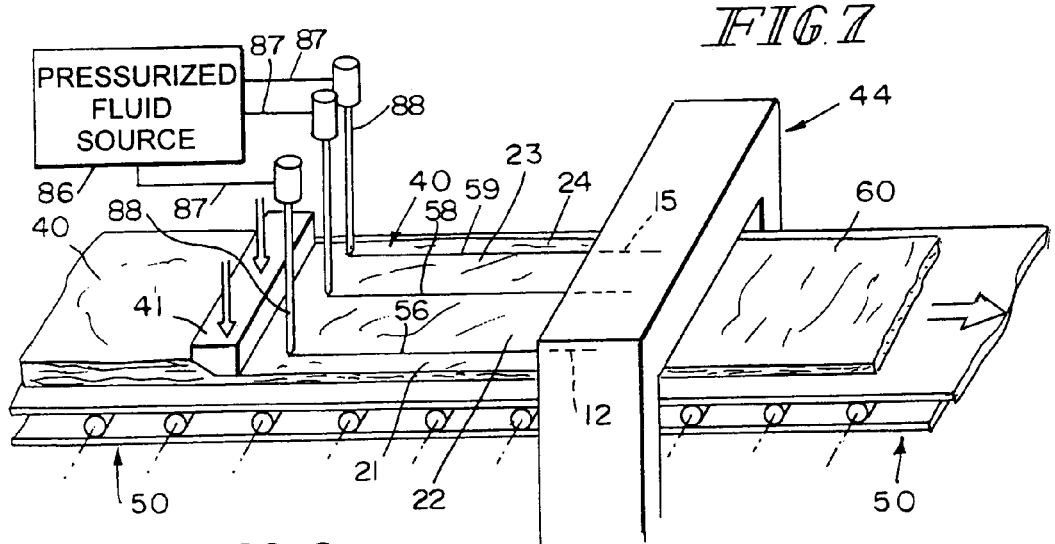
FIG. 8 is a perspective view of a system similar to the system illustrated in FIG. 4 showing the use of a "strip press" to compress the uncured fiberglass insulation to a compacted thickness and the use of nozzles to direct streams of pressurized fluid onto the compacted fiberglass insulation to form cuts extending all of the way through the compacted fiberglass insulation to define separated side-by-side strips of fiberglass upstream of the curing oven.

Several configurations of cutter 42 that fall within the scope of this disclosure are illustrated in FIGS. 6-8. Cutter 42 is used to cut fiberglass insulation 40 to produce a series of strips (e.g., strips 21, 22, 23) wherein each pair of adjacent strips is separated by a longitudinally extending gap (e.g., gaps 56, 58).

A pair of cutter disks 70 are mounted to lie above a roller 72 located between two sections of conveyor 50 as shown, for example, in FIG. 6. A TEFLON® coating is applied to an exterior surface of roller 72. These cutter disks 70 are supported by mounts 74 and are arranged to slice all of the way through uncured fiberglass insulation 40 moving with conveyor 50 before that insulation 40 is moved into curing oven 44.

One or more cutter blades 76 included in a motorized rotary-driven power cutter 78 are used to form a series of cuts extending all of the way through uncured fiberglass insulation 40 to define separated side-by-side strips of fiberglass insulation upstream of curing oven 44 as suggested in FIG. 7. Power cutter 78 includes a shaft 80 mounted above conveyor 50 for rotation about an axis 82 in response to operation of motor 84 and a series of cutter blades 76 mounted on shaft 80 to rotate therewith. These cutter blades 76 rotate to produce gaps 56, 58, and 59 which lead to formation of frangible planes 12, 14, 15 in curing oven 44.

As suggested in FIG. 8, a pressurized fluid source 86 supplies high-pressure fluid through fluid transfer conduits 87 to fluid-jet nozzles 88 to generate streams of fluid that pass through uncured fiberglass insulation 40 to create longitudinally extending gaps 56, 58, and 59. Strip press 41 is positioned to lie upstream of fluid-jet nozzles 88 to compress uncured fiberglass insulation 40 to a compacted thickness selected to facilitate "cutting" of uncured fiberglass insulation 40 using fluid-jet nozzles 88.

The invention claimed is:

1. A frangible fiberglass insulation batt comprises
   first and second longitudinally extending cured fiberglass strips separated by a longitudinally extending gap, each strip comprising cured glass fibers coated with a polymerized binder, and
   a longitudinally extending frangible polymerized binder bridge spanning the longitudinally extending gap and retaining the first and second longitudinally extending cured strips in side-by-side relation to one another, the bridge comprising polymerized binder and an insubstantial amount of glass fibers to cause the bridge to be characterized by internal bonds that are relatively weak in comparison to internal bonds associated with the glass fibers and polymerized binder comprising each of the first and second longitudinally extending cured fiberglass strips.

2. The batt of claim 1, further comprising means for establishing an indicator line extending along the longitudinally extending frangible polymerized binder bridge to enable a worker in the field at a construction site to discern the location of the longitudinally extending frangible polymerized binder bridge so that the worker can pull one strip laterally away from the other strip using a peeling-away action owing to relatively weak internal bonds established in the longitudinally extending frangible polymerized binder bridge.

3. The batt of claim 2, wherein the establishing means comprises an indicator line applied to an exterior surface of the longitudinally extending frangible polymerized binder bridge.

4. The batt of claim 2, wherein the establishing means comprises a facing material pre-marked with an indicator line and affixed to an exterior surface of at least the first and second longitudinally extending cured fiberglass strips to align the indicator line with the longitudinally extending frangible polymerized binder bridge.

5. The batt of claim 1, wherein the bridge spanning the longitudinally extending gap and retaining the first and second longitudinally extending cured strips in side-by-side relation to one another comprises polymerized hinder from the coating of binder on the glass fibers.

6. The batt of claim 5, wherein the bridge spanning the longitudinally extending gap and retaining the first and second longitudinally extending cured strips in side-by-side relation to one another comprises polymenzed binder from the coating of binder on the glass fibers which formed the bridge during curing.

7. The batt of claim 5, wherein the bridge spanning the longitudinally extending gap and retaining the first and second longitudinally extending cured strips in side-by-side relation to one another is composed of polymerized binder from the coating of binder on the glass fibers.

* * * * *